3,276,186
FILTER COMPOSITION AND METHOD OF REMOVING HYDROGEN SULFIDE FROM WATER

John J. Hronas, Pittsburgh, and Joseph L. Rizzo, Pitcairn, Pa., assignors to Calgon Corporation, a corporation of Pennsylvania
No Drawing. Filed July 22, 1964, Ser. No. 384,523
10 Claims. (Cl. 55—36)

This invention relates to cuprous oxide filter compositions and to the removal of hydrogen sulfide from water therewith.

The removal or inactivation of hydrogen sulfide in water has long been a perplexing problem in the water treatment field. A conventional filter, such as one containing activated carbon and diatomaceous earth, for example, has no significant effect on dissolved gases, notably hydrogen sulfide. It had become customary, where hydrogen sulfide was a problem, to include a device known as a "prefilter" in the water line upstream of the filter. In one manner or another, the hydrogen sulfide-bearing water was aerated or chlorinated, for example, to oxidize the $H_2S$, precipitate it, or otherwise render it filterable or less objectionable in odor. Such an arrangement calls for relatively elaborate feeding equipment and a corresponding degree of care and expense. Moreover, often these prefilters operate poorly in the presence of oxygen.

We have discovered that filter compositions containing finely divided cuprous oxide are effective in removing hydrogen sulfide from water. Cuprous oxide filter compositions require no attention or additional equipment such as a prefilter, and are effective in the presence of dissolved oxygen. Since cuprous oxide is relatively insoluble, very little copper passes through the filter, generally less than 3 p.p.m. though the amount increases at lower pH values.

Cuprous oxide may be added to virtually any filter composition, such as dolomite, fine sand, carboxy methyl cellulose, diatomaceous earth, or activated carbon. For example, a workable filter composition might contain about 1–99% activated carbon, up to about 99% diatomaceous earth, and about 1–80% cuprous oxide. Compositions may also contain water to make them fluid and more easily handled.

One of our preferred filter composiitons consists of about 53–73% activated carbon, about 4–8% diatomaceous earth, and about 20–40% cuprous oxide.

Another of our preferred filter compositions which we have found to be very effective in removing combined chlorine, such as chloramines, as well as in removing hydrogen sulfide, consists of about 50–70% activated carbon, about 5–15% dolomite, about 3–7% diatomaceous earth, and about 15–35% cuprous oxide.

The particle size of the components of various filter compositions containing cuprous oxide may vary considerably. Too large a particle size, however, will lack sufficient surface area and therefore be wasteful, and too small a particle size will cause unduly slow filtration. We prefer U.S. Standard sieve mesh size of minus 325 for most components; however, any mesh size between about 100 and about 350 is practical.

Compositions may be coated on fiber septums, made into a porous rock, or otherwise brought into contact with water containing hydrogen sulfide.

Laboratory experiments were conducted to determine how much $H_2S$ a cuprous oxide filter would remove before becoming saturated. In these experiments, solutions containing hydrogen sulfide at varying concentrations between 1.5 and 3.5 p.p.m. were run through diatomaceous earth-activated carbon filters containing cuprous oxide. The following table gives the results:

| Run No. | $Cu_2O$ (gm.) | $H_2S$ (removed) (gm.) | Total Volume (gal.) |
|---|---|---|---|
| 1 | 20.0 | 22.86 | 2,010 |
| 2 | 10.0 | 13.62 | 1,830 |
| 3 | 20.0 | 8.64 | 1,440 |
| 4 | 10.0 | 9.18 | 1,520 |

In Run No. 2, it is indicated that one mole of cuprous oxide can remove up to about six times as many moles of hydrogen sulfide, or, stated otherwise, that 0.7 gram of cuprous oxide will remove up to about 1.0 gram of hydrogen sulfide. However, we have observed that when a mole of cuprous oxide has removed about four and a half moles of hydrogen sulfide, the composition begins to bleed hydrogen sulfide somewhat.

In addition to these laboratory experiments, we have conducted may field tests. Our cuprous oxide filter compositions have successfully removed $H_2S$ from home wells, industrial waters, and other $H_2S$-containing waters. Our compositions have even been successful in removing the $H_2S$ smell from water used in soft drink vending machines.

It will be seen that our invention includes filter compositions containing cuprous oxide and the method of removing hydrogen sulfide from water therewith. We do not intend to be limited to the specific compositions and methods disclosed herein for illustrative purposes. Our invention may be otherwise practiced and embodied within the scope of the following claims.

We claim:
1. A filter composition useful for removing hydrogen sulfide from liquids comprising, by weight, about 1% to about 99% activated carbon, up to about 99% filter medium, and about 1% to about 80% cuprous oxide.
2. Method of removing hydrogen sulfide from a liquid comprising contacting said liquid with the filter composition of claim 1.
3. Method of removing hydrogen sulfide from water comprising contacting said water with filter composition of claim 1.
4. Filter composition of claim 1 in which the filter medium is diatomaceous earth.
5. Method of removing hydrogen sulfide from a liquid comprising contacting said liquid with the filter composition of claim 4.
6. Method of removing hydrogen sulfide from water comprising contacting said water with filter composition of claim 4.
7. A filter composition useful for removing hydrogen sulfide from liquids comprising, by weight, about 53% to about 73% activated carbon, about 4% to about 8% diatomaceous earth, and about 20% to about 40% cuprous oxide.

8. Method of removing hydrogen sulfide from a liquid comprising contacting said liquid with the filter composition of claim 7.

9. Method of removing hydrogen sulfide from water comprising contacting said water with the filter composition of claim 7.

10. A filter composition useful for removing hydrogen sulfide from liquids comprising, by weight, about 50% to about 70% activated carbon, about 5% to about 15% dolomite, about 3% to about 7% diatomaceous earth, and about 15% to about 35% cuprous oxide.

References Cited by the Examiner

UNITED STATES PATENTS

| | | | |
|---|---|---|---|
| 666,044 | 1/1901 | Barr | 23—2 |
| 1,519,470 | 12/1924 | Wilson et al. | 252—447 |
| 1,908,545 | 5/1933 | Schwab et al. | 210—50 |
| 1,915,874 | 6/1933 | Sweeney | 210—29 |
| 2,273,297 | 2/1942 | Szayna | 23—3.1 |

FOREIGN PATENTS 203,354     1923    Great Britain.

MORRIS O. WOLK, *Primary Examiner.*

MICHAEL E. ROGERS, *Examiner.*